(12) United States Patent
Blanchard et al.

(10) Patent No.: US 12,535,670 B2
(45) Date of Patent: Jan. 27, 2026

(54) METHOD AND APPARATUS FOR CALIBRATING AN IMAGING SYSTEM

(71) Applicant: THRIVE BIOSCIENCE, INC., Wakefield, MA (US)

(72) Inventors: Alan Blanchard, Wakefield, MA (US); Arthur Lico, Manchester, MA (US); Michael Moody, Wilmington, MA (US)

(73) Assignee: THRIVE BIOSCIENCE, INC., Wakefield, MA (US)

( * ) Notice: Subject to any disclaimer, the term of this patent is extended or adjusted under 35 U.S.C. 154(b) by 0 days.

(21) Appl. No.: 18/695,531

(22) PCT Filed: Sep. 27, 2022

(86) PCT No.: PCT/US2022/044877
§ 371 (c)(1),
(2) Date: Mar. 26, 2024

(87) PCT Pub. No.: WO2023/049504
PCT Pub. Date: Mar. 30, 2023

(65) Prior Publication Data
US 2024/0288677 A1  Aug. 29, 2024

Related U.S. Application Data

(60) Provisional application No. 63/248,677, filed on Sep. 27, 2021.

(51) Int. Cl.
*G02B 21/36* (2006.01)
(52) U.S. Cl.
CPC ......... *G02B 21/367* (2013.01); *G02B 21/368* (2013.01)

(58) Field of Classification Search
CPC ...... C12M 41/36; G02B 21/36; G02B 21/367; G02B 21/368
See application file for complete search history.

(56) References Cited

U.S. PATENT DOCUMENTS

| | | | |
|---|---|---|---|
| 10,537,304 B2* | 1/2020 | Barthe | A61B 8/467 |
| 2012/0172795 A1* | 7/2012 | Sandhu | G16Z 99/00 |
| | | | 604/95.01 |
| 2017/0370848 A1 | 12/2017 | Kielhorn et al. | |
| 2018/0307005 A1 | 10/2018 | Price et al. | |
| 2020/0308531 A1* | 10/2020 | Kodandaramaiah | C12M 21/08 |
| 2021/0278652 A1 | 9/2021 | Donneys et al. | |
| 2022/0360703 A1* | 11/2022 | Ly | H04N 23/60 |

OTHER PUBLICATIONS

International Search Report issued Nov. 23, 2022, in connection with PCT International Application No. PCT/US22/044877.
Written Opinion issued Jan. 5, 2023, in connection with PCT International Application No. PCT/US22/044877.

* cited by examiner

*Primary Examiner* — Peter D Le
(74) *Attorney, Agent, or Firm* — Norris McLaughlin, PA

(57) ABSTRACT

A method and apparatus for calibrating an imaging system provides a program stored in the imaging system having a graphical user interface and providing a plurality of tools to align hardware components of the imaging system including cameras for imaging cell culture vessels received by the imaging system and having a tool for providing a video image output of a cell culture vessel received in the imaging system.

8 Claims, 20 Drawing Sheets

File

| Open | 📁 | Loads an image from a file and displays on the screen |
|---|---|---|
| Save | 💾 | Saves the displayed image to a PNG file |
| Exit | ▬ | Exits CASP application |

View

| Zoom in | 🔍 | Zooms in |
|---|---|---|
| Zoom out | 🔍 | Zooms out |
| Fit to window | 🔍 | Fits displayed image to monitor window |
| Normal size | 🔍 | Displays image in its actual size |
| Clear | ✏ | Erases image from the monitor window |

Camera

| Open all | 🔒 | Forces CellAssist to release control of the cameras |
|---|---|---|
| Close all | 🔓 | Returns cameras' control back to Cell Assist |
| Illumination Off | ✖ | Turns illumination off |
| Illumination Brightfield | ☀ | Sets illumination to Brightfield |
| Illumination Phase Contrast | ✦ | Sets illumination to Phase Contrast |
| Continuous shot | ▮ | Enables live image acquisition |
| Single shot | ⧈ | Grabs a single image frame |
| Stop | ⊙ | Disables live image acquisition |

Fig. 33A

Rambo

| | | |
|---|---|---|
| Home | 🏠 | Homes stepper motors |
| Eject | ◁ | Ejects the tray |
| Retract | ▲ | Retracts the tray |

Tools

| | | |
|---|---|---|
| Calibrate motor limits | ✣ | Calibrates the end-stop limits for each stepper motor |

Window

| | | |
|---|---|---|
| Calibration Workflow | ✣ | Toggles the Calibration workflow window |
| Devices | ☰ | Toggles the Devices panel |
| Autofocus | ⁂ | Toggles the Autofocus panel |
| Histogram | ▲ | Toggles the Histogram panel |
| Exposure | ◆ | Toggles the Exposure panel |
| Cells Shell | ❋ | Toggles the Cells Shell window |
| Output | ▫ | Toggles the Output window |
| Frame Capture | ◐ | Toggles the Frame Capture panel |
| Reticle | ◈ | Toggles the Reticle panel |
| Navigation | ● | Toggles the Navigation panel |
| Station Coordinates | ⁘ | Toggles the Station Coordinates panel |
| Control | ✛ | Toggles the Control panel |

Fig. 33B

METHOD AND APPARATUS FOR CALIBRATING AN IMAGING SYSTEM

PRIORITY CLAIM

This application is a 371 of International Patent Application No. PCT/US2022/044877, filed Sep. 27, 2022, which claims priority of U.S. Provisional Application Ser. No. 63/248,677 filed Sep. 27, 2021, the contents of which patent applications are hereby incorporated herein by reference.

FIELD OF THE INVENTION

The present invention relates to imaging systems and in particular to methods and apparatus for calibrating imaging systems and in particular imaging systems for cell cultures.

BACKGROUND

Cell culture incubators are used to grow and maintain cells from cell culture, which is the process by which cells are grown under controlled conditions. Cell culture vessels containing cells are stored within the incubator, which maintains conditions such as temperature and gas mixture that are suitable for cell growth. Cell imagers take images of individual or groups of cells for cell analysis.

Cell culture is a useful technique in both research and clinical contexts. However, maintenance of cell cultures, for example, long term cultures, tissue preparations, in vitro fertilization preparations, etc., in presently available cell incubators is a laborious process requiring highly trained personnel and stringent aseptic conditions.

Cell culture imaging systems are by necessity precision instruments. An example of such an imaging system is described in U.S. application Ser. No. 15/563,375 filed on Mar. 31, 2016 and the disclosure of which in its entirety is hereby incorporated by reference. In order to achieve reliable measurements with such imaging systems, it is important to ensure the accuracy thereof.

SUMMARY

The object of the present invention is to provide an improved method and apparatus of calibrating an imaging system.

These and other objects of the present invention are achieved in accordance with the present invention by an imaging system set-up program in a graphical user interface (GUI) software application, composed of a collection of tools that are primarily designed to set up and calibrate the imaging system using hardware components of the imaging system.

One embodiment of the method of calibrating an imaging system comprises a program stored in the imaging system having a graphical user interface and providing a plurality of tools to align hardware components of the imaging system including cameras for imaging cell culture vessels received by the imaging system and having a tool for providing a video image output of a cell culture vessel received in the imaging system. The video is real time or time lapse. The time lapse or real time video is captured and stored in memory for later viewing either locally or remotely.

In some embodiments, the imaging system can be used as a stand-alone imaging system or it can be integrated in a cell incubator using a transport described in the aforementioned application incorporated by reference. In some embodiments, the imaging system is integrated in a cell incubator and includes a transport.

The tools according to the present invention can be used individually or in different combinations depending upon the hardware and software available in the imaging system. The invention herein includes all of the tools either used individually or in any combination.

In some embodiments the imaging system provides objective data, images, guidance and documentation that improves cell culture process monitoring and decision-making.

In some embodiments the imaging system enables routine and accurate confluence measurements that enable biologists to quantify responses to stimulus or intervention, such as the administration of a therapeutic to a cell line.

The imaging systems capture the entire well area with higher coverage than conventional imaging and enables the highest level of statistical rigor for quantifying cell status and distribution.

In some embodiments, the imaging system provides image processing and algorithms that will deliver an integration of individual and group morphologies with process-flow information and biological outcomes. Full well imaging allows the analysis and modeling of features of groups of cells-conducive to modeling organizational structures in biological development. These capabilities can be used for prediction of the organizational tendency of culture in advance of functional testing.

In some embodiments, algorithms are used to separate organizational patterns between samples using frequency of local slope field inversions. Using some algorithms, the method and system can statistically distinguish key observed differences between iP-MSCs generated from different TCP conditions. Biologically, this work could validate serum-free differentiation methods for iPSC MSC differentiation. Computationally, the method and system can inform image-processing of MSCs in ways that less neatly "clustered" image sets are not as qualified to do.

In certain embodiments, an imager includes one or more lenses, fibers, cameras (e.g., a charge-coupled device camera), apertures, mirrors, light sources (e.g., a laser or lamp), or other optical elements. An imager may be a microscope. In some embodiments, the imager is a bright-field microscope. In other embodiments, the imager is a holographic imager or microscope. In other embodiments the imager is a phase-contrast microscope. In other embodiments, the imager is a fluorescence imager or microscope.

As used herein, the fluorescence imager is an imager which is able to detect light emitted from fluorescent markers present either within or on the surface of cells or other biological entities, said markers emitting light in a specific wavelength when absorbing a light of different specific excitation wavelength.

As used herein, a "bright-field microscope" is an imager that illuminates a sample and produces an image based on the light absorbed by the sample. Any appropriate bright-field microscope may be used in combination with an incubator provided herein.

As used herein, a "phase-contrast microscope" is an imager that converts phase shifts in light passing through a transparent specimen to brightness changes in the image. Phase shifts themselves are invisible but become visible when shown as brightness variations. Any appropriate phase-contrast microscope may be used in combination with an incubator provided herein.

As used herein, a "holographic imager" is an imager that provides information about an object (e.g., sample) by measuring both intensity and phase information of electromagnetic radiation (e.g., a wave front). For example, a holographic microscope measures both the light transmitted after passing through a sample as well as the interference pattern (e.g., phase information) obtained by combining the beam of light transmitted through the sample with a reference beam.

A holographic imager may also be a device that records, via one or more radiation detectors, the pattern of electromagnetic radiation, from a substantially coherent source, diffracted or scattered directly by the objects to be imaged, without interfering with a separate reference beam and with or without any refractive or reflective optical elements between the substantially coherent source and the radiation detector(s).

In some embodiments, holographic microscopy is used to obtain images (e.g., a collection of three-dimensional microscopic images) of cells for analysis (e.g., cell counting) during culture (e.g., long-term culture) in an incubator (e.g., within an internal chamber of an incubator as described herein). In some embodiments, a holographic image is created by using a light field, from a light source scattered off objects, which is recorded and reconstructed. In some embodiments, the reconstructed image can be analyzed for a myriad of features relating to the objects. In some embodiments, methods provided herein involve holographic interferometric metrology techniques that allow for non-invasive, marker-free, quick, full-field analysis of cells, generating a high resolution, multi-focus, three-dimensional representation of living cells in real time.

In some embodiments, holography involves shining a coherent light beam through a beam splitter, which divides the light into two equal beams: a reference beam and an illumination beam. In some embodiments, the reference beam, often with the use of a mirror, is redirected to shine directly into the recording device without contacting the object to be viewed. In some embodiments, the illumination beam is also directed, using mirrors, so that it illuminates the object, causing the light to scatter. In some embodiments, some of the scattered light is then reflected onto the recording device. In some embodiments, a laser is generally used as the light source because it has a fixed wavelength and can be precisely controlled. In some embodiments, to obtain clear images, holographic microscopy is often conducted in the dark or in low light of a different wavelength than that of the laser in order to prevent any interference. In some embodiments, the two beams reach the recording device, where they intersect and interfere with one another. In some embodiments, the interference pattern is recorded and is later used to reconstruct the original image. In some embodiments, the resulting image can be examined from a range of different angles, as if it was still present, allowing for greater analysis and information attainment.

In some embodiments, digital holographic microscopy is used in incubators described herein. In some embodiments, digital holographic microscopy light wave front information from an object is digitally recorded as a hologram, which is then analyzed by a computer with a numerical reconstruction algorithm. In some embodiments, the computer algorithm replaces an image forming lens of traditional microscopy. The object wave front is created by the object's illumination by the object beam. In some embodiments, a microscope objective collects the object wave front, where the two wave fronts interfere with one another, creating the hologram. Then, the digitally recorded hologram is transferred via an interface (e.g., IEEE1394, Ethernet, serial) to a PC-based numerical reconstruction algorithm, which results in a viewable image of the object in any plane.

In some embodiments, in order to procure digital holographic microscopic images, specific materials are utilized. In some embodiments, an illumination source, generally a laser, is used as described herein. In some embodiments, a Michelson interferometer is used for reflective objects. In some embodiments, a Mach-Zehnder interferometer for transmissive objects is used. In some embodiments, interferometers can include different apertures, attenuators, and polarization optics in order to control the reference and object intensity ratio. In some embodiments, an image is then captured by a digital camera, which digitizes the holographic interference pattern. In some embodiments, pixel size is an important parameter to manage because pixel size influences image resolution. In some embodiments, an interference pattern is digitized by a camera and then sent to a computer as a two-dimensional array of integers with 8-bit or higher grayscale resolution. In some embodiments, a computer's reconstruction algorithm then computes the holographic images, in addition to pre- and post-processing of the images.

Phase Shift Image

In some embodiments, in addition to the bright field image generated, a phase shift image results. Phase shift images, which are topographical images of an object, include information about optical distances. In some embodiments, the phase shift image provides information about transparent objects, such as living biological cells, without distorting the bright field image. In some embodiments, digital holographic microscopy allows for both bright field and phase contrast images to be generated without distortion. Also, both visualization and quantification of transparent objects without labeling is possible with digital holographic microscopy. In some embodiments, the phase shift images from digital holographic microscopy can be segmented and analyzed by image analysis software using mathematical morphology, whereas traditional phase contrast or bright field images of living unstained biological cells often cannot be effectively analyzed by image analysis software.

In some embodiments, a hologram includes all of the information pertinent to calculating a complete image stack. In some embodiments, since the object wave front is recorded from a variety of angles, the optical characteristics of the object can be characterized, and tomography images of the object can be rendered. From the complete image stack, a passive autofocus method can be used to select the focal plane, allowing for the rapid scanning and imaging of surfaces without any vertical mechanical movement. Furthermore, a completely focused image of the object can be created by stitching the sub-images together from different focal planes. In some embodiments, a digital reconstruction algorithm corrects any optical aberrations that may appear in traditional microscopy due to image-forming lenses. In some embodiments, digital holographic microscopy advantageously does not require a complex set of lenses; but rather, only inexpensive optics, and semiconductor components are used in order to obtain a well-focused image, making it relatively lower cost than traditional microscopy tools.

In some embodiments, holographic microscopy can be used to analyze multiple parameters simultaneously in cells, particularly living cells. In some embodiments, holographic microscopy can be used to analyze living cells, (e.g., responses to stimulated morphological changes associated with drug, electrical, or thermal stimulation), to sort cells, and to monitor cell health. In some embodiments, digital holographic microscopy counts cells and measures cell viability directly from cell culture plates without cell labeling. In other embodiments, the imager can be used to examine apoptosis in different cell types, as the refractive index changes associated with the apoptotic process can be quantified via digital holographic microscopy. In some embodiments, digital holographic microscopy is used in research regarding the cell cycle and phase changes. In some embodiments, dry cell mass (which can correlate with the phase shift induced by cells), in addition to other non-limiting measured parameters (e.g., cell volume, and the refractive index), can be used to provide more information about the cell cycle at key points.

In some embodiments, the method is also used to examine the morphology of different cells without labeling or staining. In some embodiments, digital holographic microscopy can be used to examine the cell differentiation process; providing information to distinguish between various types of stem cells due to their differing morphological characteristics. In some embodiments, because digital holographic microscopy does not require labeling, different processes in real time can be examined (e.g., changes in nerve cells due to cellular imbalances). In some embodiments, cell volume and concentration may be quantified, for example, through the use of digital holographic microscopy's absorption and phase shift images. In some embodiments, phase shift images may be used to provide an unstained cell count. In some embodiments, cells in suspension may be counted, monitored, and analyzed using holographic microscopy.

In some embodiments, the time interval between image acquisitions is influenced by the performance of the image recording sensor. In some embodiments, digital holographic microscopy is used in time-lapse analyses of living cells. For example, the analysis of shape variations between cells in suspension can be monitored using digital holographic images to compensate for defocus effects resulting from movement in suspension. In some embodiments, obtaining images directly before and after contact with a surface allows for a clear visual of cell shape. In some embodiments, a cell's thickness before and after an event can be determined through several calculations involving the phase contrast images and the cell's integral refractive index. Phase contrast relies on different parts of the image having different refractive index, causing the light to traverse different areas of the sample with different delays. In some embodiments, such as phase contrast microscopy, the out of phase component of the light effectively darkens and brightens particular areas and increases the contrast of the cell with respect to the background. In some embodiments, cell division and migration are examined through time-lapse images from digital holographic microscopy. In some embodiments, cell death or apoptosis may be examined through still or time-lapse images from digital holographic microscopy.

In some embodiments, digital holographic microscopy can be used for tomography, including but not limited to, the study of subcellular motion, including in living tissues, without labeling.

In some embodiments, digital holographic microscopy does not involve labeling and allows researchers to attain rapid phase shift images, allowing researchers to study the minute and transient properties of cells, especially with respect to cell cycle changes and the effects of pharmacological agents.

These and other features and advantages, which characterize the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

BRIEF DESCRIPTION OF THE DRAWINGS

FIGS. 33A and 33B is a listing of the menus and tool bars of the program; and

DETAILED DESCRIPTION

Figure 1:
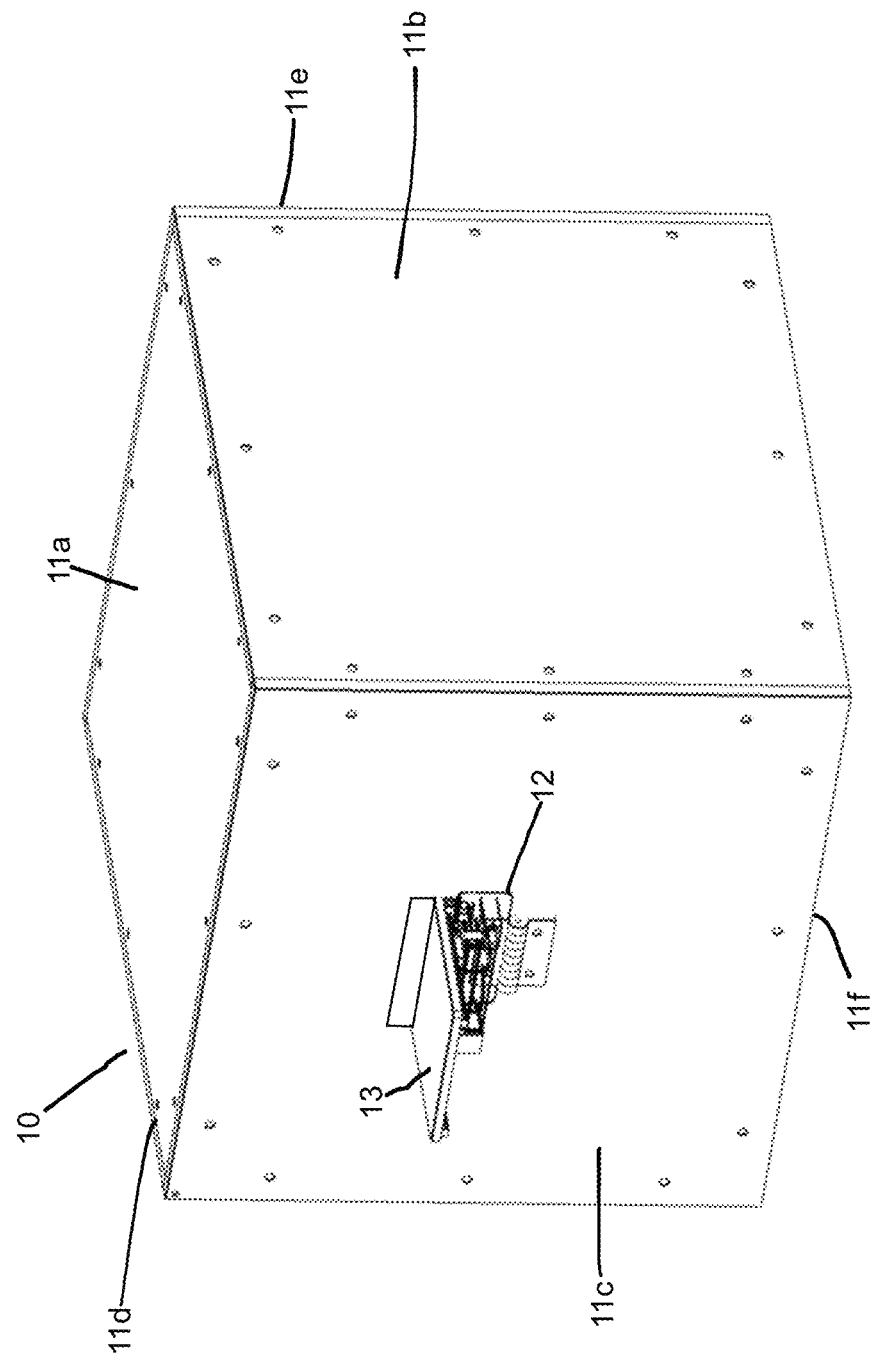
FIG. 1 is a perspective view of the imaging system calibrated in accordance with the invention.

Referring now to FIG. 1, a cell imaging system 10 is shown. Preferably, the system 10 is fully encased with walls 11a-11f so that the interior of the imager can be set at 98.6 degrees F. with a $CO_2$ content of 5%, so that the cells can remain in the imager without damage. The temperature and the $CO_2$ content of the air in the system 10 is maintained by a gas feed port 14 (shown in FIG. 2) in the rear wall 11e. Alternatively, a heating unit can be installed in the system 10 to maintain the proper temperature.

At the front wall 11c of the system 10, is a door 12 that is hinged to the wall 11c and which opens a hole H through which the sliding platform 13 exits to receive a plate and closes hole H when the platform 13 is retracted into the system 10.

Figure 2:
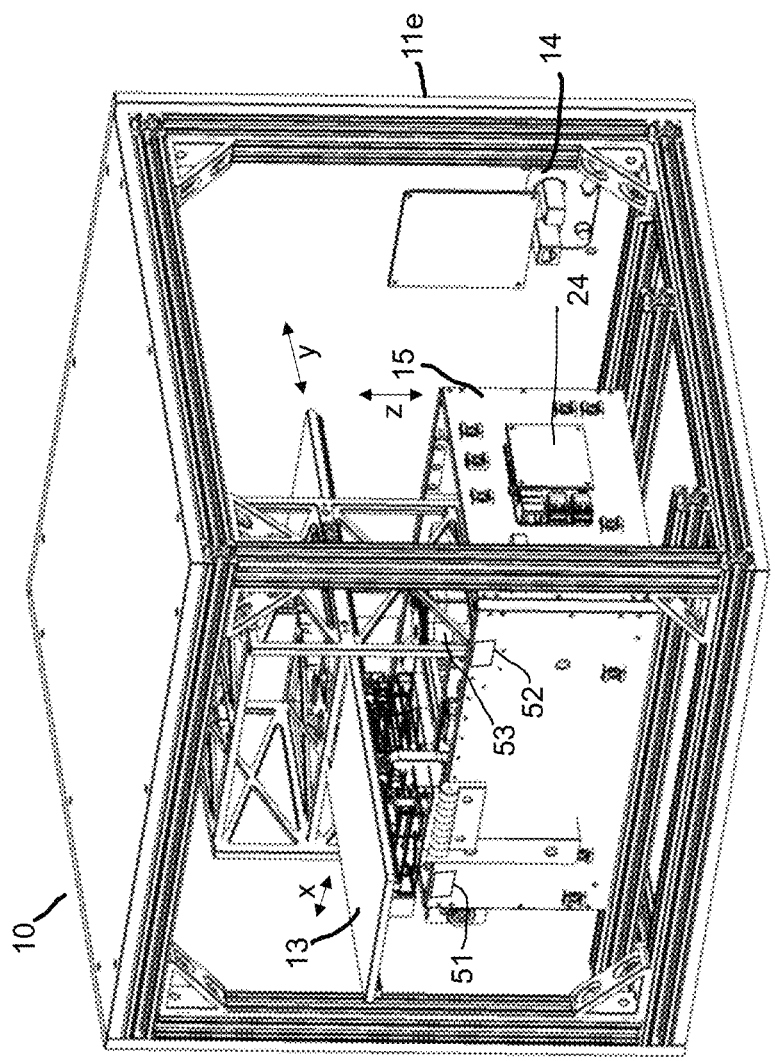
FIG. 2 is the imaging system of FIG. 1 with walls removed to reveal the internal structure.

The system 10 has a Raspberry Pi processor 24 (see FIG. 2) for controlling servo motors and is connected to a desktop or rack mounted computer 41 (see FIG. 6) via an ethernet connection which runs the calibration program in accordance with the invention and which also controls the cameras via a USB connection to camera controllers 42. The connection is by way of an ethernet connector 15 in the rear wall 11e of the system as shown in FIG. 2. The desktop computer has a Linux operating system, although a Mac OS or Windows OS can be used.

FIG. 2 shows the system with walls 11b and 11c removed to show the internal structure. The extent of the platform 13 is shown as well as the circuit board 15 that contains much of the circuitry for the system. There is a servomotor 53 which moves the cameras relative to the housing 15 in the z-axis direction. There are also x direction end stop sensors 51 and 52 for limiting the x axis movement of the cameras.

Figure 3:
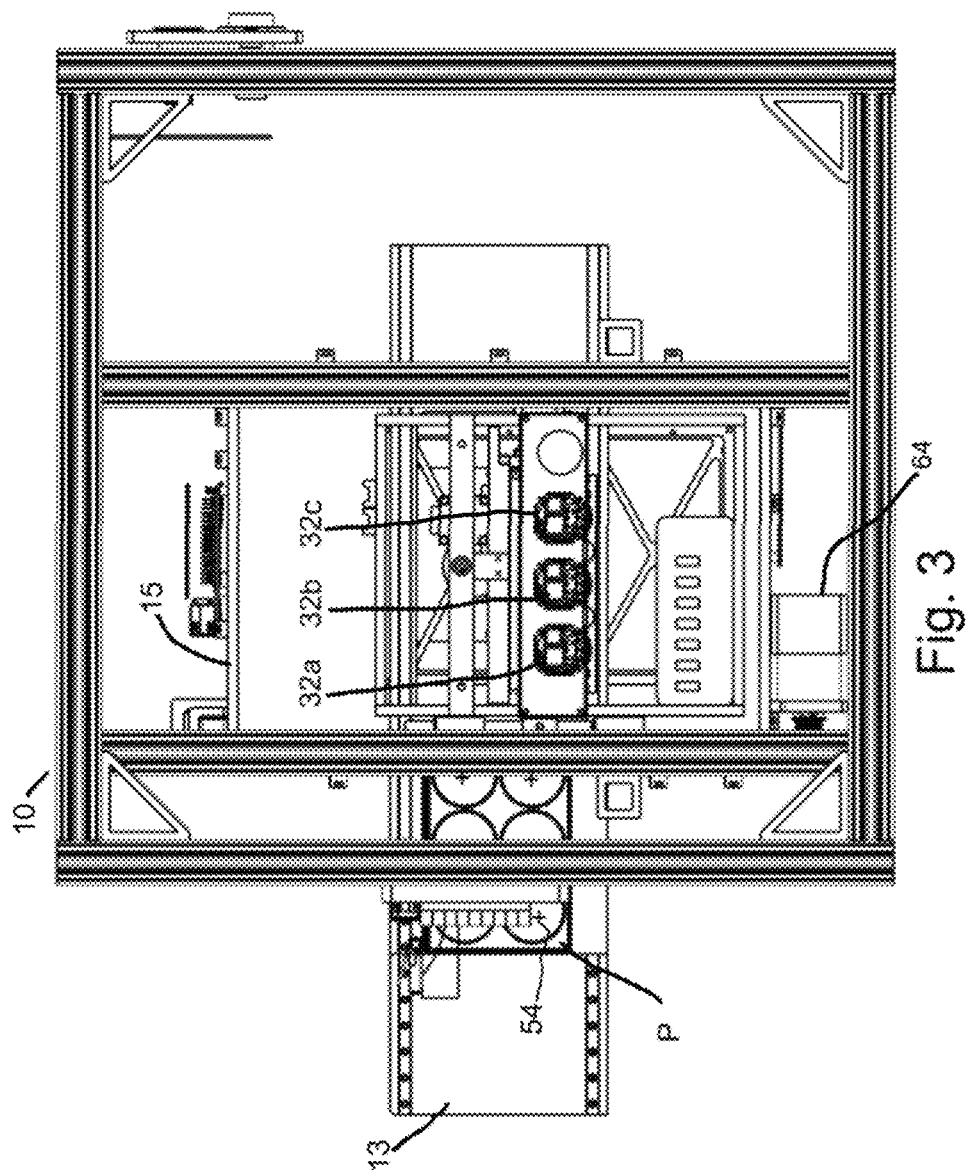
FIG. 3 is a top view of the imaging system of FIG. 1 with the walls removed.
Figure 4:
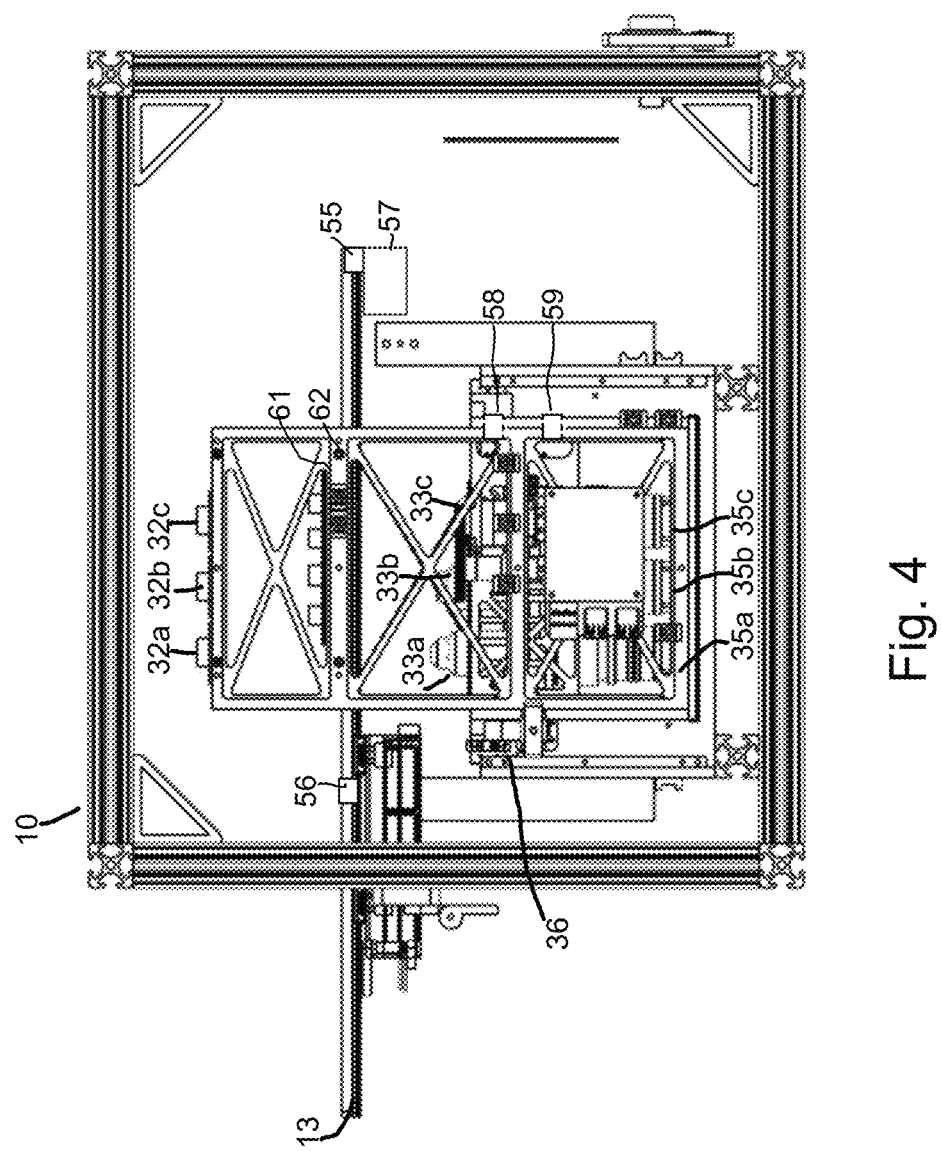
FIG. 4 is a right side view of the imaging system of FIG. 1.

FIG. 3 shows a top view of the imaging system where plate P having six wells is loaded for insertion into the system on platform 13. Motor 64 draws the platform 13 and the loaded plate P in the X-direction. The movement of the platform is to cause each of the wells to be placed under one of the LED light clusters 32a, 32b, and 32c which are aligned with microscope camera optics 33a, 33b and 33c respectively which are preferably 4×, 10× and 20× phase-contrast and brightfield optics which are shown in FIG. 4.

As used herein, an "imager" refers to an imaging device for measuring light (e.g., transmitted or scattered light), color, morphology, or other detectable parameters such as a number of elements or a combination thereof. An imager may also be referred to as an imaging device. In certain embodiments, an imager includes one or more lenses, fibers, cameras (e.g., a charge-coupled device or CMOS camera), apertures, mirrors, light sources (e.g., a laser or lamp), or other optical elements. An imager may be a microscope. In some embodiments, the imager is a bright-field microscope. In other embodiments, the imager is a holographic imager or microscope. In other embodiments, the imager is a fluorescence microscope.

As used herein, a "fluorescence microscope" refers to an imaging device which is able to detect light emitted from fluorescent markers present either within and/or on the surface of cells or other biological entities, said markers emitting light at a specific wavelength in response to the absorption a light of a different wavelength.

As used herein, a "bright-field microscope" is an imager that illuminates a sample and produces an image based on the light absorbed by the sample. Any appropriate bright-field microscope may be used in combination with an incubator provided herein.

As used herein, a "holographic imager" is an imager that provides information about an object (e.g., sample) by measuring both intensity and phase information of electromagnetic radiation (e.g., a wave front). For example, a holographic microscope measures both the light transmitted after passing through a sample as well as the interference pattern (e.g., phase information) obtained by combining the beam of light transmitted through the sample with a reference beam.

A holographic imager may also be a device that records, via one or more radiation detectors, the pattern of electromagnetic radiation, from a substantially coherent source, diffracted or scattered directly by the objects to be imaged, without interfering with a separate reference beam and with or without any refractive or reflective optical elements between the substantially coherent source and the radiation detector(s).

In some embodiments, an incubator cabinet includes a single imager. In some embodiments, an incubator cabinet includes two imagers. In some embodiments, the two imagers are the same type of imager (e.g., two holographic imagers or two bright-field microscopes). In some embodiments, the first imager is a bright-field microscope and the second imager is a holographic imager. In some embodiments, an incubator cabinet comprises more than 2 imagers. In some embodiments, cell culture incubators comprise three imagers. In some embodiments, cell culture incubators having 3 imagers comprise a holographic microscope, a bright-field microscope, and a fluorescence microscope.

As used herein, an "imaging location" is the location where an imager images one or more cells. For example, an imaging location may be disposed above a light source and/or in vertical alignment with one or more optical elements (e.g., lens, apertures, mirrors, objectives, and light collectors).

Figure 5:
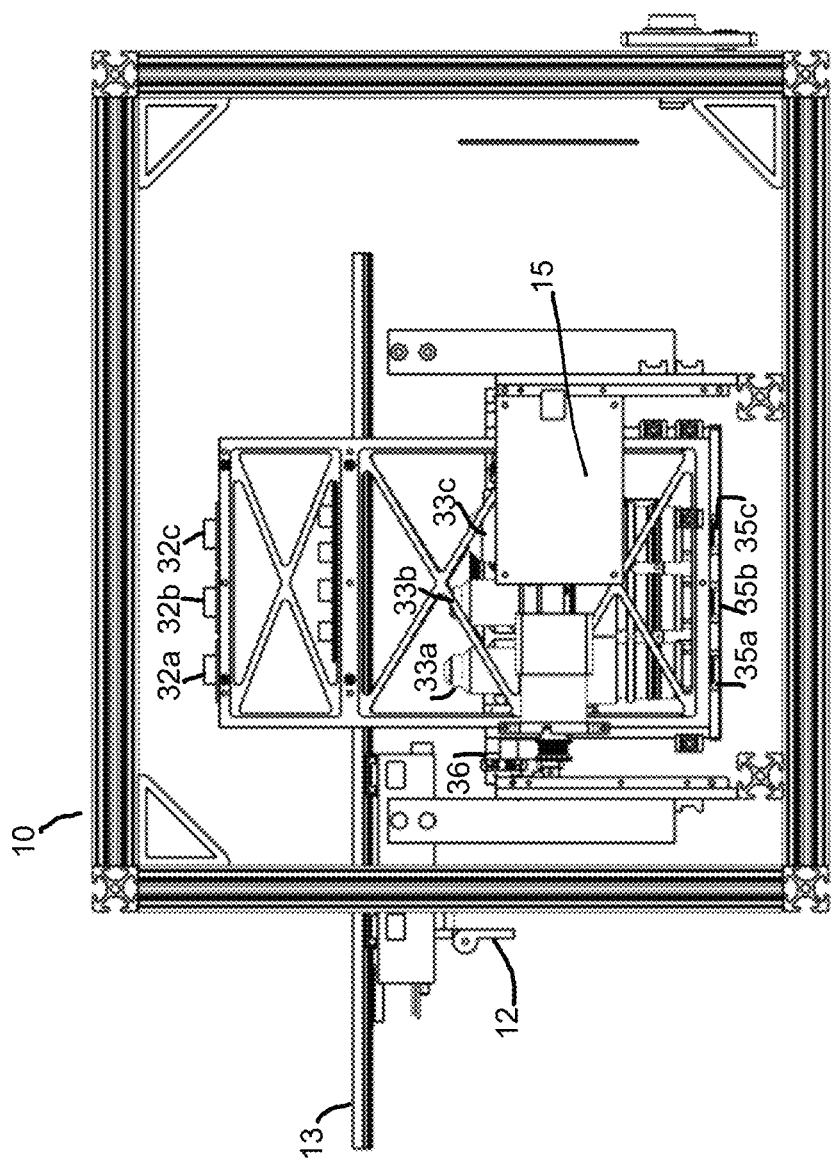
FIG. 5 is a left side view of the imaging system of FIG. 1.

In FIG. 4, there is the y-axis servomotor 57 and the y axis end stops 55 and 56. The platform also has leveling screws 61 and 62 for manually leveling the platform relative to the image plane of the cameras. Referring to FIGS. 4 and 5, under the control of the processor 24, the servo motors bring each well in within the view of a camera 33a-33c and so that the entire well can be imaged. The servo motors also vary the z-direction so that a z-stack image can be obtained, as is described hereinafter. The corresponding LEDs are turned on for brightfield illumination. The image seen by the optical unit is recorded by the respective video camera 35a, 35b, and 35c corresponding to the optical unit. The imaging and the storing of the images are all under the control of the computer 41 and image processor 22. After the imaging is completed, the platform with the loaded plate is ejected from the system and the plate can be removed and placed in an incubator. Focusing of the microscope optics is along the z axis and images taken at different distances along the z axis is called the z-stack.

Figure 6:
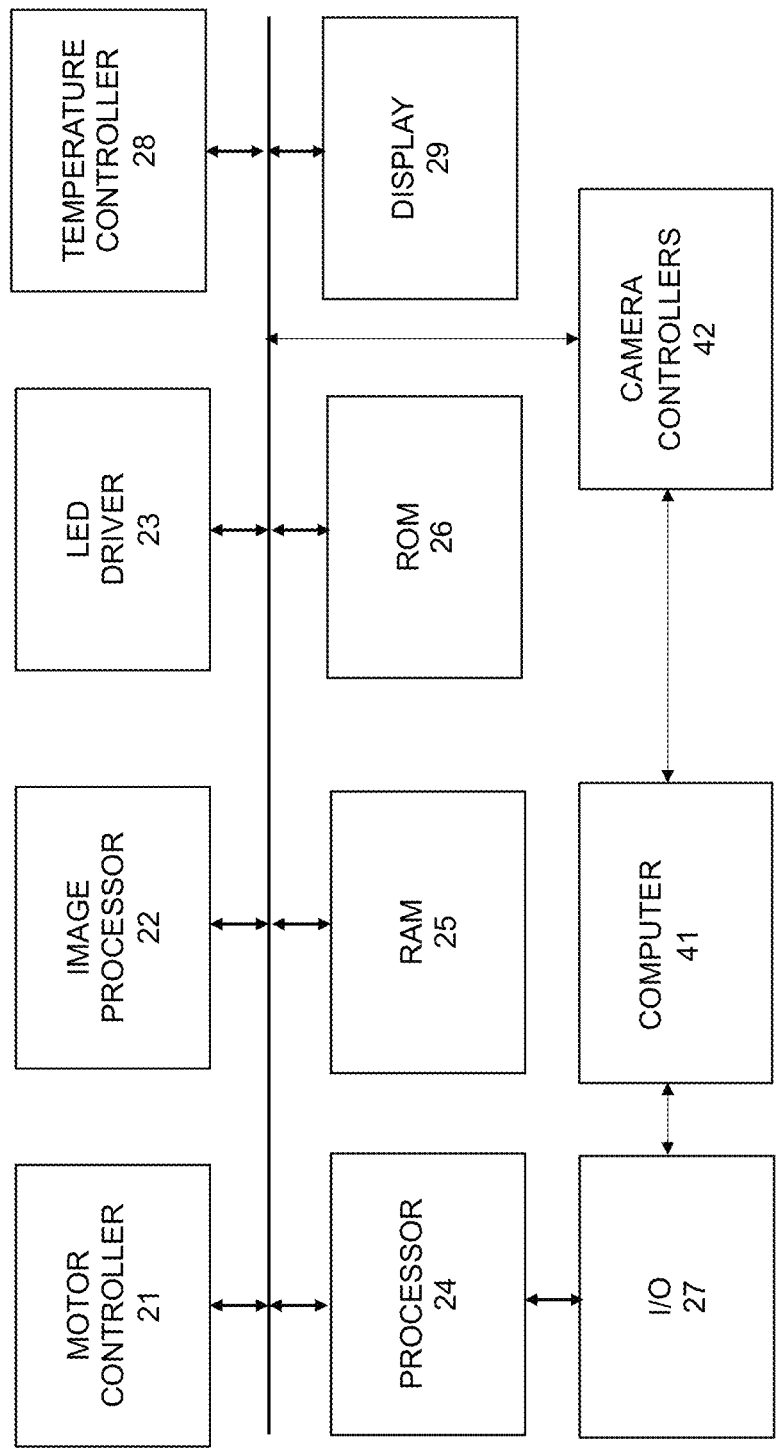
FIG. 6 is a block diagram of the circuitry of the method and apparatus of calibrating the imaging system of FIG. 1.

FIG. 6 is a block diagram of the circuitry for controlling the system 10. The system is run by processor 24 which is a microcontroller or microprocessor which has associated RAM 25 and ROM 26 for storage of firmware and data. The processor controls LED driver 23 which turns the LEDs on and off as required. The motor controller 21 moves the servo motors to position the wells in an imaging position as desired by the user. In a preferred embodiment, the system can complete a quick scan of the plate in less than 1 minute and a full scan in less than 4 minutes.

The circuitry also includes a temperature controller 28 for maintaining the temperature at 98.6 degrees F. The processor 24 is connected to an I/O 27 that connects to computer 41 which controls the cameras through a USB connection to camera controller circuitry 42. The I/O 27 also permits connection to a tablet such as an iPad or Android tablet or laptop for receiving imaging data and images. The connection to an external computer allows the display of the device to act as a user interface and for image processing to take place using a more powerful processor and for image storage to be done on a drive having more capacity. Alternatively, the system can include a display 29 such as a tablet mounted on one face of the system and an image processor 22 and the RAM 25 can be increased to permit the system to operate as a self-contained unit.

The image processing either on board or external, has algorithms for artificial intelligence and intelligent image analysis. The image processing permits trend analysis and forecasting, documentation and reporting, live/dead cell counts, confluence percentage and growth rates, cell distribution and morphology changes, and the percentage of differentiation.

When a new cell culture plate is imaged for the first time by the microscope optics, a single z-stack, over a large focal range, of phase contrast images is acquired from the center of each well using the 4× camera. The z-height of the best focused image is determined using the focusing method, described below. The best focus z-height for each well in that specific cell culture plate is stored in the plate database in RAM 25 or in a remote computer. When a future image scan of that plate is done using either the 4× or 10× camera, in either brightfield or phase contrast imaging mode, the z-stack of images collected for each well are centered at the best focus z-height stored in the plate database. When a future image scan of that plate is done using the 20× camera, a pre-scan of the center of each well using the 10× camera is performed and the best focus z-height is stored in the plate database to define the center of the z-stack for the 20× camera image acquisition.

Each whole well image is the result of the stitching together of a number of tiles. The number of tiles needed depend on the size of the well and the magnification of the camera objective. A single well in a 6-well plate is the stitched result of 35 tiles from the 4× camera, 234 tiles from the 10× camera, or 875 tiles from the 20× camera.

The higher magnification objective cameras have smaller optical depth, that is, the z-height range in which an object is in focus. To achieve good focus at higher magnification, a smaller z-offset needs to be used. As the magnification increases, the number of z-stack images needs to increase or the working focal range needs to decrease. If the number of z-stack images increases, more resources are required to acquire the image, time, memory, processing power. If the focal range decreases, the likelihood that the cell images will be out of focus is greater, due to instrument calibration accuracy, cell culture plate variation, well coatings, etc.

In one implementation, the starting z-height value is determined by a database value assigned stored remotely or in local RAM. The z-height is a function of the cell culture plate type and manufacturer and is the same for all instruments and all wells. Any variation in the instruments, well plates, or coatings needs to be accommodated by a large number of z-stacks to ensure that the cells are in the range of focus adjustment. In practice this results in large imaging times and is intolerance to variation, especially for higher magnification objective cameras with smaller depth of field. For example, the 4× objective camera takes 5 z-stack images with a z-offset of 50 µm for a focal range of 5*50=250 µm. The 10× objective camera takes 11 z-stack images with a z-offset of 20 µm for a focal range of 11*20=220 µm. The 20× objective camera takes 11 z-stack images with a z-offset of 10 µm for a focal range of 11*10=110 µm.

The imaging system set-up program (ISSP) is a graphical user interface (GUI) software application, composed of a collection of tools that are primarily designed to set up and calibrate an imaging system.

Figure 7:
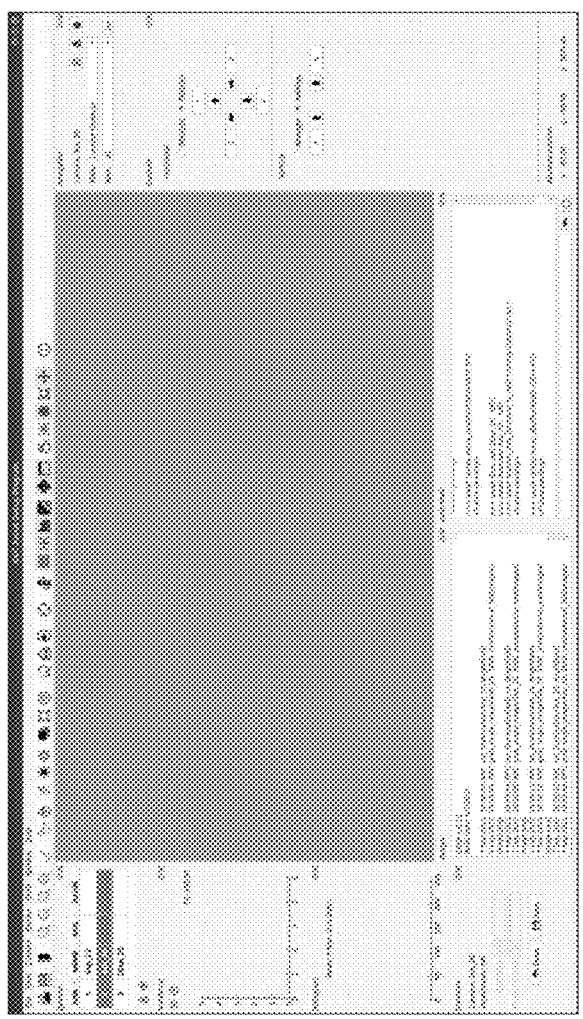
FIG. 7 is a screen shot of the main window of the program for calibrating an imaging system.

ISSP's main window in FIG. 7 acts as a container for all its graphical subcomponents. Tools that perform a specific function are grouped into toolboxes or panels that can be docked to either side of the main window. All panels can be detached from the main window and moved around as floating windows. Additionally, their visibility can be toggled using Window's menu or toolbar buttons. The middle area is reserved for viewing live or still images obtained from the USB cameras.

Calibration Workflow

Figure 8:
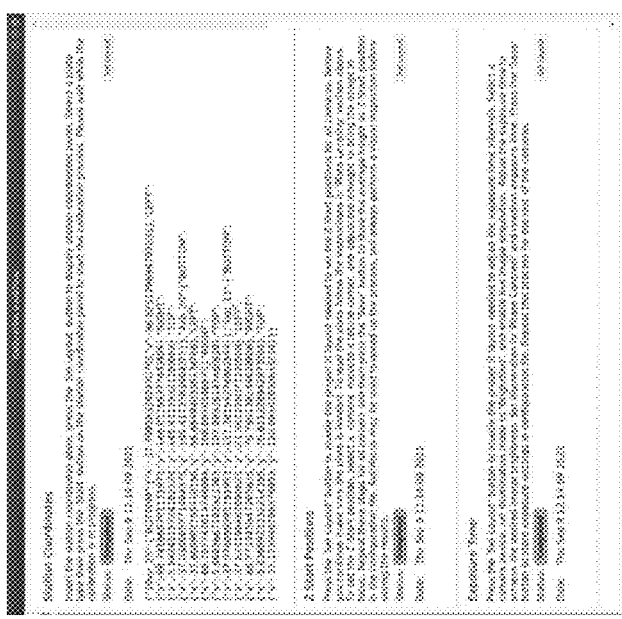
FIG. 8 is a screen shot of a calibration workflow window of the program.

The purpose of the Calibration Workflow window in FIG. 8 is to list all the necessary stages of imaging system calibration. Each section provides a short description of the calibration process and its status. The Set Layout button can be used to change the main window's layout, displaying tools that are appropriate for performing a particular calibration stage.

Some sections like Station Coordinates will also display calibration results below the completion date.

Devices

Figure 9:
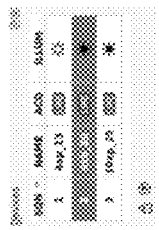
FIG. 9 is a screen shot of the devices toolbox of the program.

The Devices toolbox docked to the left side of the main window, as shown in FIG. 9, displays a list of camera devices connected to the imaging system instrument. The information is arranged in a tabular format where each row represents a single device. The four columns display device properties such as the sequence number which is indicative of the camera's position relative to other devices, the device name, image acquisition mode, and illumination type.

When live image acquisition is enabled, the  icon is shown under the ACQ column. The illumination type can be Brightfield , Phase Contrast , or Off (blank). The list of devices can be sorted by each column.

As part of the calibration procedure, each camera device is assigned a unique name. This is accomplished by first unlocking the editing mode-selecting the lock icon  shown on the bottom left of the Devices toolbox, then typing a new name into the NAME cell of each device. When done, the changes can be applied by selecting the Apply icon .

Monitors

Figure 10:
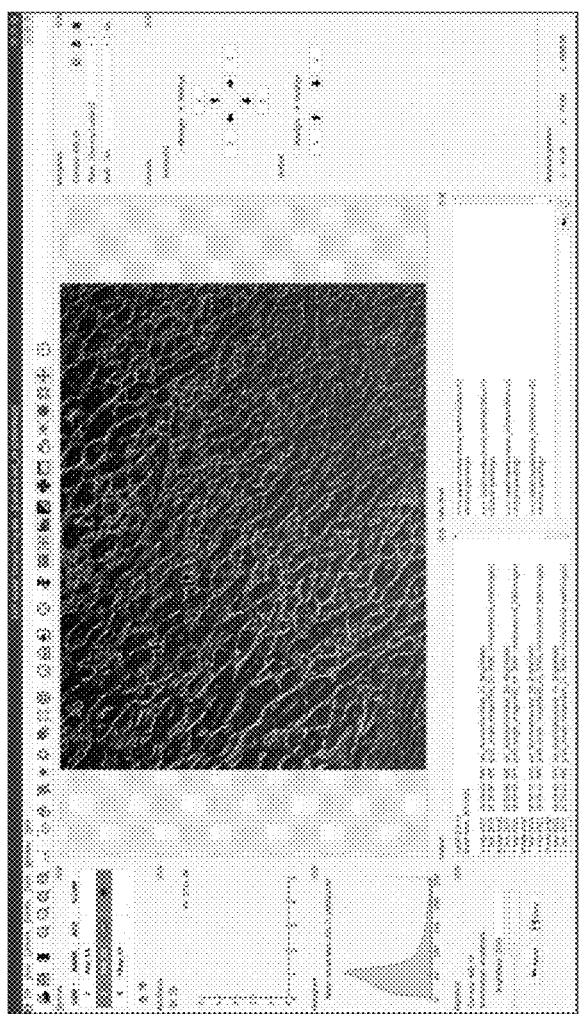
FIG. 10 is a screen shot of a device monitor of the program.

A device monitor is a child window, as shown in FIG. 10, of the main window that is used to display live or still images obtained for a selected camera. It can be shown by simply double-clicking anywhere on a device row area of the Devices list. By default the monitors are shown in fullscreen, occupying the entire middle area. In this mode, only one monitor can be viewed at a time.

To exit the fullscreen, select the monitor's restore icon  located on the upper right corner of the main window.

When not in fullscreen mode, the monitors can be viewed simultaneously. They can also be dragged around and resized individually.

Figure 11:
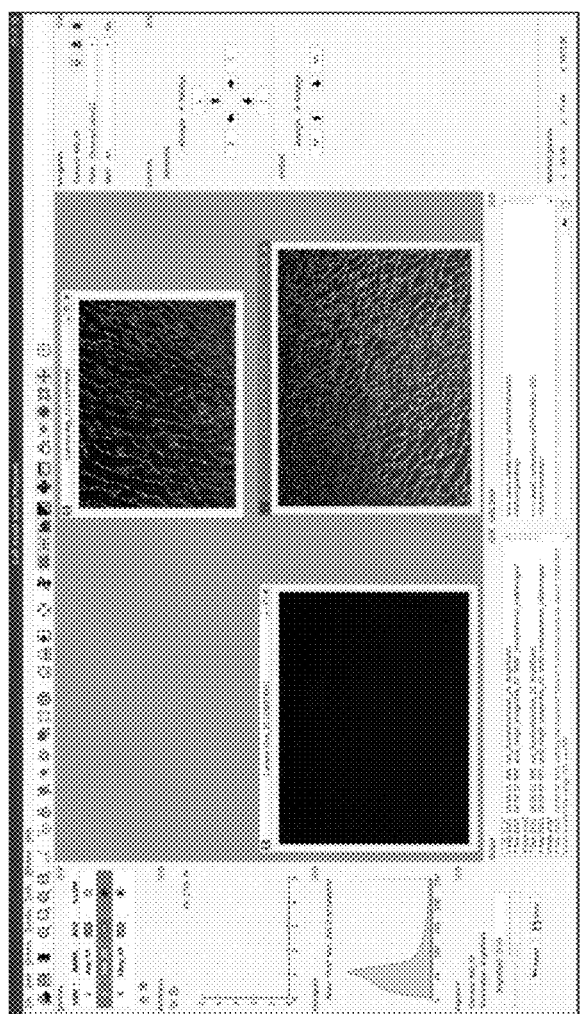
FIG. 11 is a screen shot of a selected monitor from FIG. 10.

The selected monitor is displayed with a blue title bar as shown in FIG. 11. Clicking on an unselected monitor will change device selection accordingly on the devices list and vice versa. To view a monitor in fullscreen, toggle the restore button or double-click its title bar.

The selected monitor is displayed with a blue title bar as shown in FIG. 11. Clicking on an unselected monitor will change device selection accordingly on the devices list and vice versa. To view a monitor in fullscreen, toggle the restore button or double-click its title bar.

Controls

Figure 13:
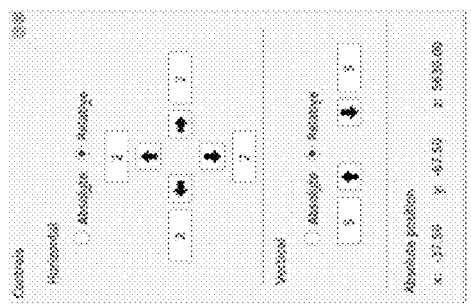
FIG. 13 is a screen shot of an interface of the FIG. 12 control panel.

The Controls panel provides a graphical interface for controlling the three stepper motors which in turn control the motion of the camera platform and the Imaging system tray. ISSP supports two types of motion, absolute and relative. The motion type can be selected by choosing the proper radio button as shown in the FIGS. 12 and 13 below.

Figure 12:
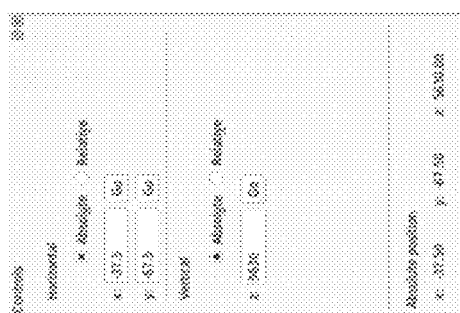
FIG. 12 is a screen shot of the controls panel of the program.

Performing an absolute motion is as simple as typing in the coordinates and pressing the corresponding Go button in FIG. 12. A motion relative to the current position can be executed in either direction using the arrow buttons provided by the interface in FIG. 13. The relative shift is specified in millimeters.

At the bottom of the panel, ISSP displays the absolute coordinates of the current position. These coordinates are updated after each move operation. A motion in progress is indicated by an animated icon  at the bottom right corner of the Controls panel.

Autofocus

As the name suggests, Autofocus can help the user find the optimal height position which produces the best in-focus image. Sometimes focusing manually on a live image can be tricky and difficult to get right. In those cases, the user can leverage ISSP's autofocusing algorithm to achieve the best focus results.

Figure 14:
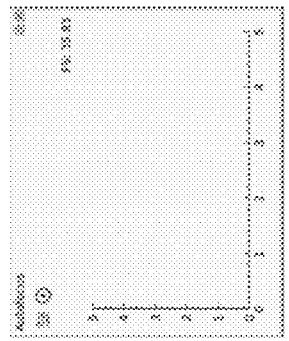
FIG. 14 is a screen shot of the autofocus tool of the program.

The focusing algorithm consists of image processing techniques that generate a focus score (FS) for each image the camera produces. The focus score is displayed in the upper right corner of the Autofocus panel shown in FIG. 14.

Figure 15:
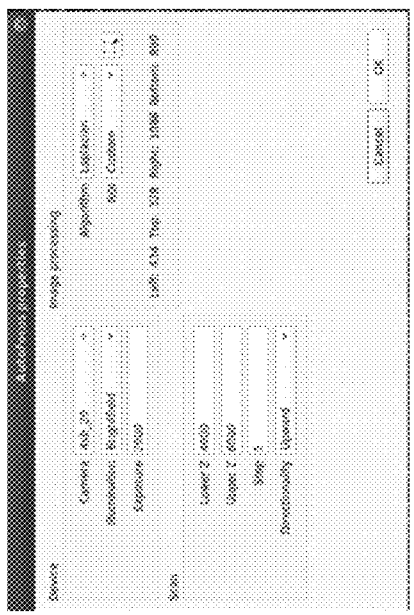
FIG. 15 is a screen shot of a properties dialog of FIG. 14.

The autofocus properties can be accessed by clicking the left-most icon  located in the upper left corner. In the properties dialog of FIG. 15, the user can select the camera, illumination type, and exposure time. Scan-related information such as the Z range, step size, and directionality can be provided in the Scan section. The user can also select the algorithm type and the region of interest (ROI) which can be the entire image or a user-defined rectangular area.

Figure 16:
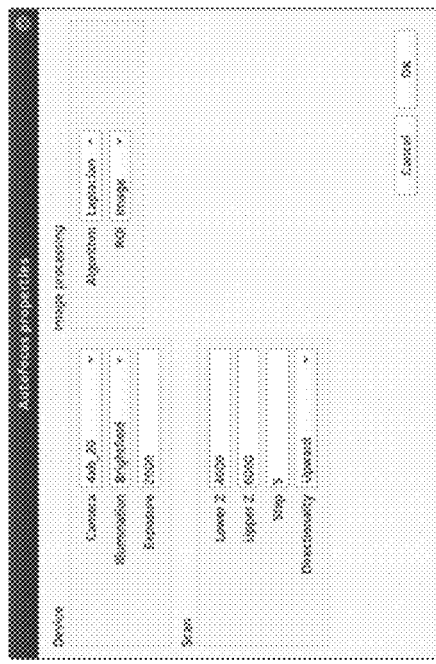
FIG. 16 is a screen shot of another properties dialog of FIG. 14.

When selecting the custom ROI option in FIG. 16, a selection icon  will be displayed on the right side of the dropdown menu.

Figure 17:
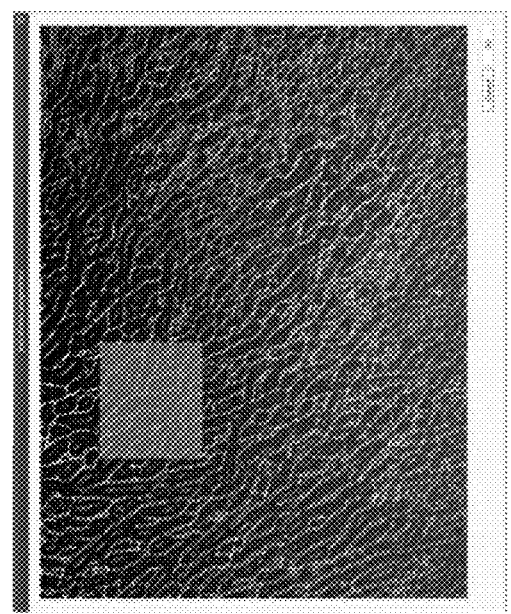
FIG. 17 is a screen shot of the region of interest positioning of FIG. 14.

Clicking the selection icon displays a live image window where the user can select the ROI by holding down the left mouse button and dragging anywhere on the image. The software draws a transparent rectangle to indicate the size and position of the ROI as shown in FIG. 17. Once selected, the window is closed and the ROI coordinates are displayed on the properties window. Pressing OK applies the autofocus settings and closes the properties window.

Figure 18:
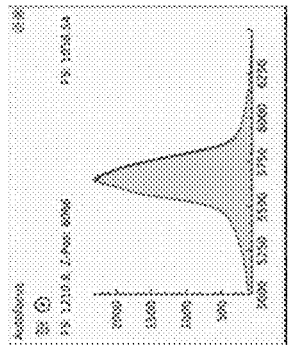
FIG. 18 is a screen shot of of the focusing optimization of the FIG. 14 tool.

The autofocus can be launched by pressing the start icon  next to the properties icon. Depending on autofocus settings, more specifically scan range and step size, this process can take as little as a few seconds or as long as a few minutes. During this time, the autofocusing algorithm calculates the FS for each Z step in the scan range. ISSP plots the FS-Z relationship in a graph that the user can later analyze. The best focusing point is normally observed under the highest peak in the graph in FIG. 18. ISSP uses this information to automatically adjust the camera height at the end of the autofocusing process.

The user can interact with the graph by hovering over the mouse cursor. Moving the cursor across the graph displays the FS and Z-Position at the corresponding mouse location. Pressing anywhere on the graph moves the camera to the clicked Z height.

Histogram

Figure 19:
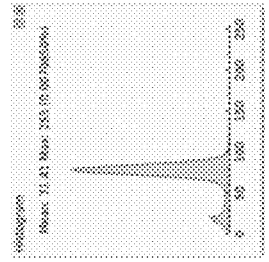
FIG. 19 is a screen shot of the histogram panel of the program.

The Histogram panel in FIG. 19 plots the frequencies of all the gray pixel values found in the current image. Additionally, the Mean, the Max gray value, and its weighted percentage are displayed above the histogram. All this information is used to determine the overall image brightness. The Mean in particular is used to adjust the camera exposure time in both illumination modes.

Exposure

Figure 21:
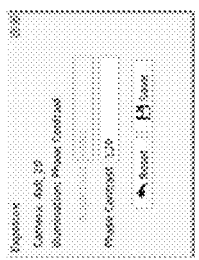
FIG. 21 is a screen shot of another exposure time setting of the program.
Figure 20:
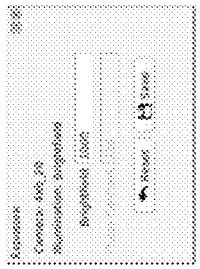
FIG. 20 is a screen shot of an exposure time setting of the program.

The Exposure panel is used to calibrate the camera's exposure time. Each camera requires two exposure settings, one per illumination type. These are shown in FIGS. 20 and 21. Normally the Brightfield illumination requires a much higher exposure time than the Phase Contrast. In live acquisition mode, an incremental change in exposure time is immediately observed as an increase in image brightness. The exposure time has a direct effect on the histogram. The calculated Mean displayed on the histogram panel is used as the main criterion for determining the proper exposure time.

Pressing the Reset button reverts exposure settings back to factory-calibrated values. To overwrite calibrated values with new ones, press the Save button and answer Yes to confirm.

Navigation

The main purpose of the Navigation panel is to allow the user to navigate a selected camera to a well location of a known plate type. ISSP has access to a built-in list of predefined plate definitions. The plate definitions are accessible through the Plate dropdown menu. The Well dropdown list is automatically updated upon plate selection.

Figure 22:
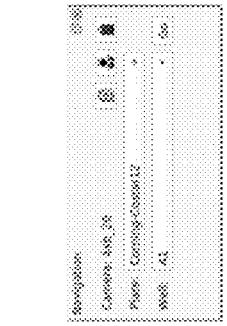
FIG. 22 is a screen shot of the navigation panel of the program.

Navigating the camera to a desired well location is as simple as selecting the plate type, well location, and pressing the Go button in FIG. 22. Doing so positions the camera underneath the center of the selected well. The Z height is also automatically adjusted to bring the image in focus.

Figure 23:
FIG. 23 is a screen shot of a dialog of the navigation panel.
Figure 24:
FIG. 24 is a screen shot of another dialog of the navigation panel.

Another important feature included in the Navigation panel is the ability to create a custom plate definition. A custom plate is first created as a copy of an existing plate using the create custom plate button  in FIG. 24. The user is required to enter a new name for the custom plate in FIG. 23. After pressing OK the plate is inserted into the plate list and automatically selected.

Once created, the vertical controls can be used to change the camera's height position until the image is in focus. The new vertical position can be applied to the custom plate by pressing the update button . Custom plates can be deleted using the remove button .

Reticle

Leveling the Imaging system tray is another important calibration stage that requires manual adjustments, camera movements, and careful visual inspection of live imagery. The Reticle panel is designed to assist the user going through this process.

Figure 25:
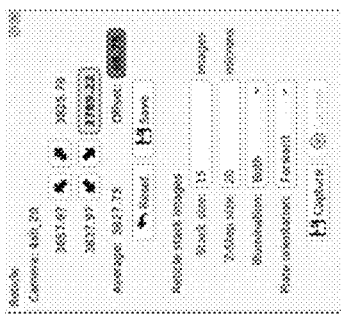
FIG. 25 is a screen shot of a reticle panel of the program.
Figure 34:
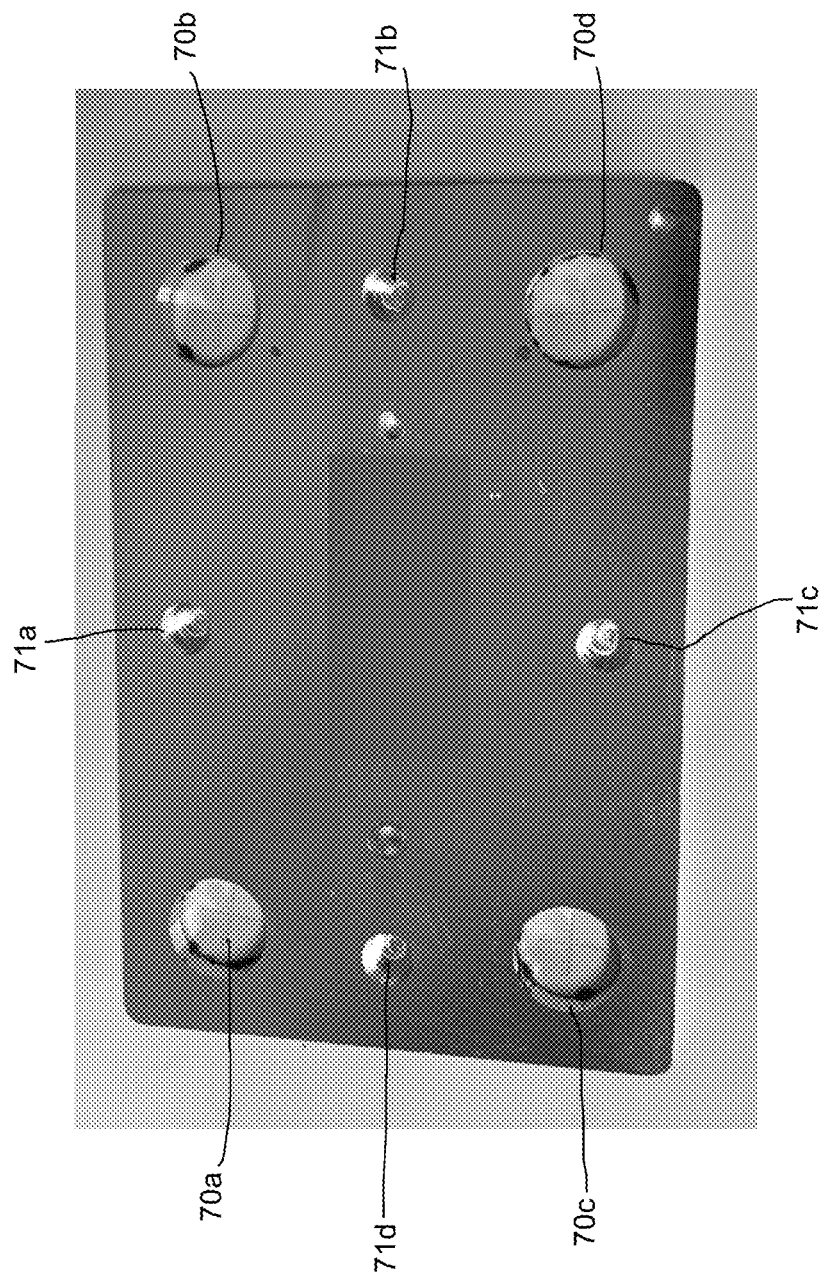
FIG. 34 is a reticle plate for calibration and station coordinates in accordance with the invention.

In order to level the plate, the user must first insert a special aluminum plate with four reticles, one on each corner shown in FIG. 34. Then the four arrows located on the Reticle panel in FIG. 25 can be selected to position the selected camera underneath each reticle. Every time a reticle is visited, the image is brought to focus by changing the camera height which is displayed on the side of the arrow button. The offset in z-height across the four reticles is computed and displayed on the Reticle panel. A red offset is an indication that the plate is unleveled and that manual adjustment is necessary.

Figure 26:
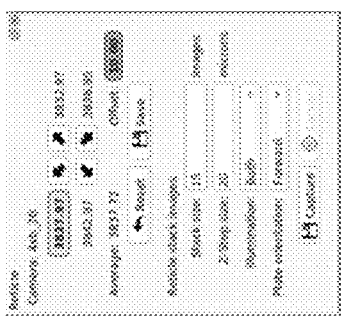
FIG. 26 is a screen shot of another reticle panel of the program.

The plate is considered leveled when the offset is below a certain threshold. An acceptable offset is highlighted in green as shown in FIG. 26. Pressing Save updates the camera's starting z-height position in the configuration file. The reticle z values can be reset at any time by pressing the Reset button.

The Reticle panel also offers the user the capability to capture and save a stack of images per each reticle location. The controls located in the lower half of the Reticle panel can be used to configure the stack size, step size, illumination type, and plate orientation.

Station Coordinates

Figure 27:
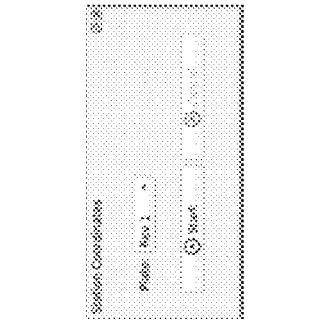
FIG. 27 is a screen shot of a station coordinates of the program.

Calibrating the station coordinates is yet another crucial step in the calibration process. It is used to determine a reference point in the horizontal plane as well as the plate's pitch rotation. The procedure requires the special aluminum plate in FIG. 34 called Station Coordinates in FIG. 27. The procedure is fully automated. All that is required of the user is the insertion of the plate and pressing of the Start button. The entire process takes about 5 minutes. Upon successful completion, calibration results are automatically saved to a configuration file.

Frame Capture

Figure 29:
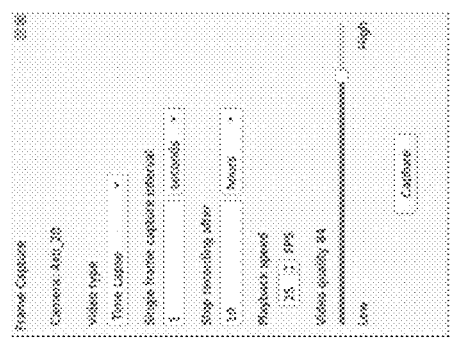
FIG. 29 is a screen shot of another frame capture control of the program.
Figure 28:
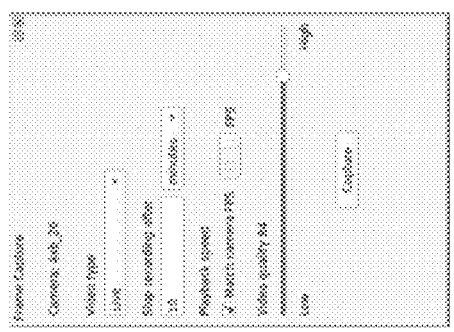
FIG. 28 is a screen shot of frame capture control of the program.

ISSP's Frame Capture controls make it possible to record live, as shown in FIG. 28, or time-lapse videos, as shown in FIG. 29, using any camera device. When recording a live video, ISSP grabs images at the highest frame rate possible. The time-lapse video option adds another row of controls where the user can specify the single image capture interval. The highest recording rate supported in time-lapse mode is one frame per second.

The next row of controls determines the total capture time interval. The units can be seconds, minutes, hours, or days. Further below the user can set the playback speed as a number between 13 and 60 frames per second. In live mode, the user has the option to match the camera frame rate which is about 13 frames per second.

The last configurable property on the Frame Capture panel is the video quality. To preserve image quality, set the video quality to high. A compromise in video quality can generate a significantly smaller video file.

Figure 30:
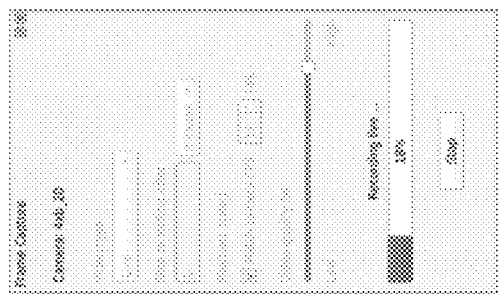
FIG. 30 is a screen shot of frame capture progress dialog of the program.

Pressing the Capture button starts recording. While recording, a progress bar shown in FIG. 30 displays completion status as a percentage. The recording automatically stops once the allocated total time interval elapses. Video recording can be stopped prematurely by pressing the Stop button.

The end result of video recording is an mp4 movie file. The absolute path to the mp4 file is displayed on the output window at the bottom of the screen. The file can be exported through a USB flash drive to another computer, either locally or remotely and played back using a media player of choice.

Output

Figure 31:
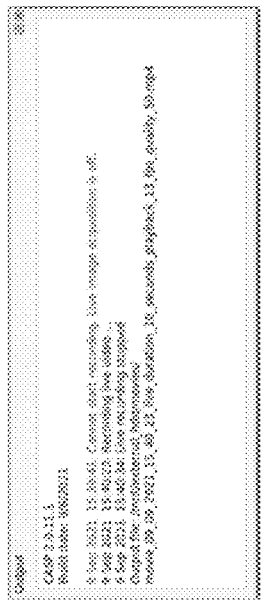
FIG. 31 is a screen shot of an output window of the program.

The purpose of the Output window in FIG. 31 is to display text messages that ISSP generates in response to user actions or when certain events occur. There are three types of messages, information, warning, and error messages. Information messages are shown in black, warnings in orange, and errors in red.

Cells Shell

Figure 32:
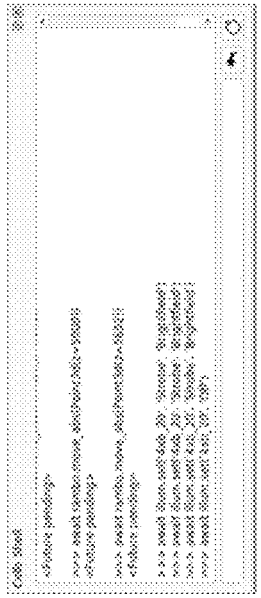
FIG. 32 is a screen shot of cells shell of the program.

Certain interactions between ISSP and hardware are performed through Cells Shell shown in FIG. 32, a stand-alone console utility. All low-level Cells Shell commands that are indirectly invoked by ISSP are displayed on the Cells Shell window docked next to the output window at the bottom of the main window.

Sometimes especially when troubleshooting an issue, it is necessary to access Cells Shell functionality directly. This can be accomplished by manually typing commands into the text field located at the bottom of the Cells Shell window. The output of each Cells Shell command is conveniently displayed in the Cells Shell window.

Menus & Toolbars

A listing of the menus and tool bars are shown in FIGS. 33A and 33B.

FIG. 34 shows the aluminum reticle block used for calibration. The block 70 includes four holes 70*a-d* in the corners with reticles therein. The block also includes holes 71*a-d* for obtaining station coordinates. The block is the size of a six well culture plate, although other sizes can be used. Alternatively, the reticles can be placed on a standard culture plate, as shown by reticle mark 54 in FIG. 3 which can be included in four corners as illustrated.

One or more imaging systems may be interconnected by one or more networks in any suitable form, including as a local area network (LAN) or a wide area network (WAN) such as an enterprise network or the Internet. Such networks may be based on any suitable technology and may operate according to any suitable protocol and may include wireless networks, wired networks, or fiber optic networks.

In another embodiment, the cell culture images for a particular culture are associated with other files related to the cell culture. For example, many cell incubators and have bar codes adhered thereto to provide a unique identification alphanumeric for the incubator. Similarly, media containers such as reagent bottles include bar codes to identify the substance and preferably the lot number. The files of image data, preferably stored as raw image data, but which can also be in a compressed jpeg format, can be stored in a database in memory along with the media identification, the unique incubator identification, a user identification, pictures of the media or other supplies used in the culturing, notes taken during culturing in the form of text, jpeg or pdf file formats.

In one embodiment, an app runs on a smartphone such as an IOS phone such as the iPhone 11 or an Android based phone such as the Samsung Galaxy S10 and is able to communicate with the imager by way of Bluetooth, Wi-Fi or other wireless protocols. The smartphone links to the imager and the bar code reader on the smartphone can read the bar code labels on the incubator, the media containers, the user id badge and other bar codes. The data from the bar codes is then stored in the database with the cell culture image files. In addition, the camera on the smartphone can be used to take pictures of the cell culture equipment and media and any events relative to the culturing to store with the cell culture image files. Notes can be taken on the smartphone and transferred to the imager either in text form or by way of scanning written notes into jpeg or pdf file formats.

The various methods or processes outlined herein may be coded as software that is executable on one or more processors that employ any one of a variety of operating systems or platforms. Such software may be written using any of a number of suitable programming languages and/or programming or scripting tools and may be compiled as executable machine language code or intermediate code that is executed on a framework or virtual machine.

One or more algorithms for controlling methods or processes provided herein may be embodied as a readable storage medium (or multiple readable media) (e.g., a non-volatile computer memory, one or more floppy discs, compact discs (CD), optical discs, digital versatile disks (DVD), magnetic tapes, flash memories, circuit configurations in Field Programmable Gate Arrays or other semiconductor devices, or other tangible storage medium) encoded with one or more programs that, when executed on one or more computing units or other processors, perform methods that implement the various methods or processes described herein.

In various embodiments, a computer readable storage medium may retain information for a sufficient time to provide computer-executable instructions in a non-transitory form. Such a computer readable storage medium or media can be transportable, such that the program or programs stored thereon can be loaded onto one or more different computing units or other processors to implement various aspects of the methods or processes described herein. As used herein, the term "computer-readable storage medium" encompasses only a computer-readable medium that can be considered to be a manufacture (e.g., article of manufacture) or a machine. Alternately or additionally, methods or processes described herein may be embodied as a computer readable medium other than a computer-readable storage medium, such as a propagating signal.

The terms "program" or "software" are used herein in a generic sense to refer to any type of code or set of executable instructions that can be employed to program a computing unit or other processor to implement various aspects of the methods or processes described herein. Additionally, it should be appreciated that according to one aspect of this embodiment, one or more programs that when executed perform a method or process described herein need not reside on a single computing unit or processor but may be distributed in a modular fashion amongst a number of different computing units or processors to implement various procedures or operations.

Executable instructions may be in many forms, such as program modules, executed by one or more computing units or other devices. Generally, program modules include routines, programs, objects, components, data structures, etc., that perform particular tasks or implement particular abstract data types. Typically, the functionality of the program modules may be organized as desired in various embodiments.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, e.g., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, e.g., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (e.g. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, e.g., to mean including but not limited to.

Only the transitional phrases "consisting of" and "consisting essentially of" shall be closed or semi-closed transitional phrases, respectively, as set forth in the United States Patent Office Manual of Patent Examining Procedures, Section 2111.03.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A method of calibrating an imaging system comprising providing a program stored in the imaging system for producing a z-stack of images of cells and having a graphical user interface and providing a plurality of tools to align hardware components of the imaging system including cameras for imaging cell culture vessels received by the imaging system, wherein the plurality of tools includes a z-stack positioning tool, an exposure time adjustment tool and a frame capture tool for capturing a live image recording of cells in a cell culture vessel for a desired time period or a time lapse recording of the cells in the cell culture vessel at a desired frame capture interval and for a desired period of time and wherein the frame capture tool includes a playback tool to play back the recordings at a desired frame rate and a desired video quality.

2. The method according to claim 1, wherein the time-lapse video recording rate is less than or equal to one frame per second.

3. The method of claim 1, wherein the recording is an mp4 movie file.

4. An apparatus for calibrating an imaging system comprising a program stored in the imaging system for producing a z-stack of images of cells and having a graphical user interface and having a plurality of tools to align hardware components of the imaging system including cameras for imaging cell culture vessels received by the imaging system, wherein the plurality of tools includes a z-stack positioning tool, an exposure time adjustment tool and a frame capture tool for capturing a live image recording of cells in a cell culture vessel for a desired time period or a time lapse recording of the cells in the cell culture vessel at a desired frame capture interval and for a desired period of time and wherein the frame capture tool includes a playback tool to play back the recordings at a desired frame rate and a desired video quality.

5. The apparatus according to claim 4, wherein the time-lapse video recording rate is less than or equal to one frame per second.

6. The apparatus of claim 4, wherein the recording is an mp4 movie file.

7. The method of claim 2, wherein the video is captured in memory.

8. The apparatus of claim 5, further comprising a memory for storing the video image output.

* * * * *